United States Patent
Merettig et al.

(10) Patent No.: US 8,963,113 B2
(45) Date of Patent: Feb. 24, 2015

(54) OPTOELECTRONIC SENSOR FOR DETECTING OBJECT EDGES

(75) Inventors: Gerhard Merettig, Sexau (DE); Roland Bergbach, Kenzingen (DE); Matthias Goetz, Freiburg (DE); Kai Waslowski, Emmendingen (DE); Ingolf Hörsch, Freiburg (DE)

(73) Assignee: Sick AG, Waldkirch (DE)

( * ) Notice: Subject to any disclaimer, the term of this patent is extended or adjusted under 35 U.S.C. 154(b) by 744 days.

(21) Appl. No.: 13/117,755

(22) Filed: May 27, 2011

(65) Prior Publication Data

US 2011/0290989 A1 Dec. 1, 2011

(30) Foreign Application Priority Data

May 31, 2010 (DE) .......................... 10 2010 022 273

(51) Int. Cl.
- H01J 40/14 (2006.01)
- G01B 11/04 (2006.01)
- G01B 11/14 (2006.01)
- G01B 11/24 (2006.01)

(Continued)

(52) U.S. Cl.
CPC ............ G01B 11/028 (2013.01); G01B 11/245 (2013.01)
USPC ....... 250/559.36; 250/224; 356/623; 356/448

(58) Field of Classification Search
CPC .... G01B 11/02; G01B 11/026; G01B 11/245; G06M 7/04; G06M 7/06
USPC ............... 250/559.29, 559.36, 559.4, 559.43, 250/224, 223 B, 223 R, 221, 222.1; 356/240.1, 445, 448, 623
See application file for complete search history.

(56) References Cited

U.S. PATENT DOCUMENTS 3,885,872 A * 5/1975 Howe et al. ............... 250/559.38
3,892,492 A * 7/1975 Eichenberger ................ 356/434

(Continued)

FOREIGN PATENT DOCUMENTS

DE 37 29 334 C2 7/1989
DE 196 24 186 A1 1/1998

(Continued)

OTHER PUBLICATIONS

European Search Report, Application No. EP 11 00 4261, completed Jul. 22, 2011.

(Continued)

*Primary Examiner* — John Lee
(74) *Attorney, Agent, or Firm* — Nath, Goldberg & Meyer; Jerald L. Meyer; Katelyn J. Bernier

(57) ABSTRACT

An optoelectronic sensor for recognizing object edges of objects moved relative to the sensor, has a light transmission device with at least one light transmitter, in particular at least two light transmitters, for generating a respective collimated or focused transmitted light beam. The sensor has at least two light receivers for imaging a light spot produced by the respective transmitted light beam on an object, wherein the two light receivers are arranged on two mutually opposite sides of the light transmission device, and has an evaluation unit which is designed to compare the two reception intensities of the two images of the respective light spot taken by the two light receivers with one another and to evaluate the result of the respective comparison to recognize an object edge.

24 Claims, 2 Drawing Sheets

(51) Int. Cl.
*G01B 11/02* (2006.01)
*G01B 11/245* (2006.01)

(56) References Cited

U.S. PATENT DOCUMENTS

| | | | |
|---|---|---|---|
| 4,112,309 A | 9/1978 | Nakazawa et al. | |
| 4,217,491 A | 8/1980 | Dufford, Jr. et al. | |
| 4,296,314 A * | 10/1981 | Dabisch et al. | 377/8 |
| 4,356,387 A * | 10/1982 | Tsubota et al. | 377/6 |
| 4,450,352 A * | 5/1984 | Olsson | 250/223 R |
| 4,469,939 A * | 9/1984 | Utagawa | 250/204 |
| 4,481,667 A * | 11/1984 | Price et al. | 382/321 |
| 4,540,887 A * | 9/1985 | Minerd et al. | 250/559.4 |
| 4,559,452 A * | 12/1985 | Igaki et al. | 250/559.36 |
| 4,814,810 A * | 3/1989 | Ishiguro | 396/120 |
| 4,845,374 A * | 7/1989 | White et al. | 250/559.4 |
| 4,899,041 A | 2/1990 | Fetzer et al. | |
| 5,114,230 A * | 5/1992 | Pryor | 356/625 |
| 5,245,177 A | 9/1993 | Schiller | 250/221 |
| 5,280,171 A | 1/1994 | Halter | |
| 5,444,264 A * | 8/1995 | Heinonen et al. | 250/559.29 |
| 5,504,345 A * | 4/1996 | Bartunek et al. | 250/559.4 |
| 5,614,710 A | 3/1997 | Mondie et al. | |
| 5,841,540 A | 11/1998 | Mondie | |
| 6,323,954 B1 | 11/2001 | Halter | |
| 6,400,460 B1 * | 6/2002 | Chen | 356/623 |
| 6,423,978 B1 * | 7/2002 | Furuta et al. | 250/559.36 |
| 6,621,092 B1 | 9/2003 | Furuta et al. | |
| 6,850,264 B2 * | 2/2005 | Hawes | 347/264 |
| 7,602,496 B2 * | 10/2009 | Harsh et al. | 356/445 |
| 7,616,328 B2 * | 11/2009 | Stern et al. | 356/623 |
| 7,652,767 B2 * | 1/2010 | Harsh et al. | 356/445 |
| 7,684,053 B2 * | 3/2010 | Chow | 356/602 |
| 7,798,634 B2 * | 9/2010 | Miyahara et al. | 347/106 |
| 2002/0024677 A1 * | 2/2002 | Metcalfe et al. | 356/625 |
| 2004/0061872 A1 * | 4/2004 | Nakano | 356/623 |
| 2005/0001153 A1 * | 1/2005 | Lauffenburger et al. | 250/221 |
| 2007/0024870 A1 * | 2/2007 | Girard et al. | 356/623 |
| 2010/0277717 A1 * | 11/2010 | Stern et al. | 356/51 |
| 2011/0222075 A1 * | 9/2011 | Takahashi | 356/623 |
| 2011/0290989 A1 * | 12/2011 | Merettig et al. | 250/224 |

FOREIGN PATENT DOCUMENTS

| | | |
|---|---|---|
| DE | 199 60 653 A1 | 6/2000 |
| DE | 102 46 449 A1 | 6/2004 |
| DE | 102009012997 A1 | 9/2010 |
| DE | 102010022273 A1 | 12/2011 |
| EP | 1039261 A2 | 9/2000 |
| EP | 1 630 519 A1 | 3/2006 |
| EP | 2348331 B1 | 7/2011 |
| EP | 2530426 A1 | 12/2012 |
| JP | 58-223004 A | 12/1983 |

OTHER PUBLICATIONS

SUNX Data Sheet., "MQ-W Series Triple Beam Trigonometric Area Reflective Photoelectric Sensors", pp. 180-185.

* cited by examiner

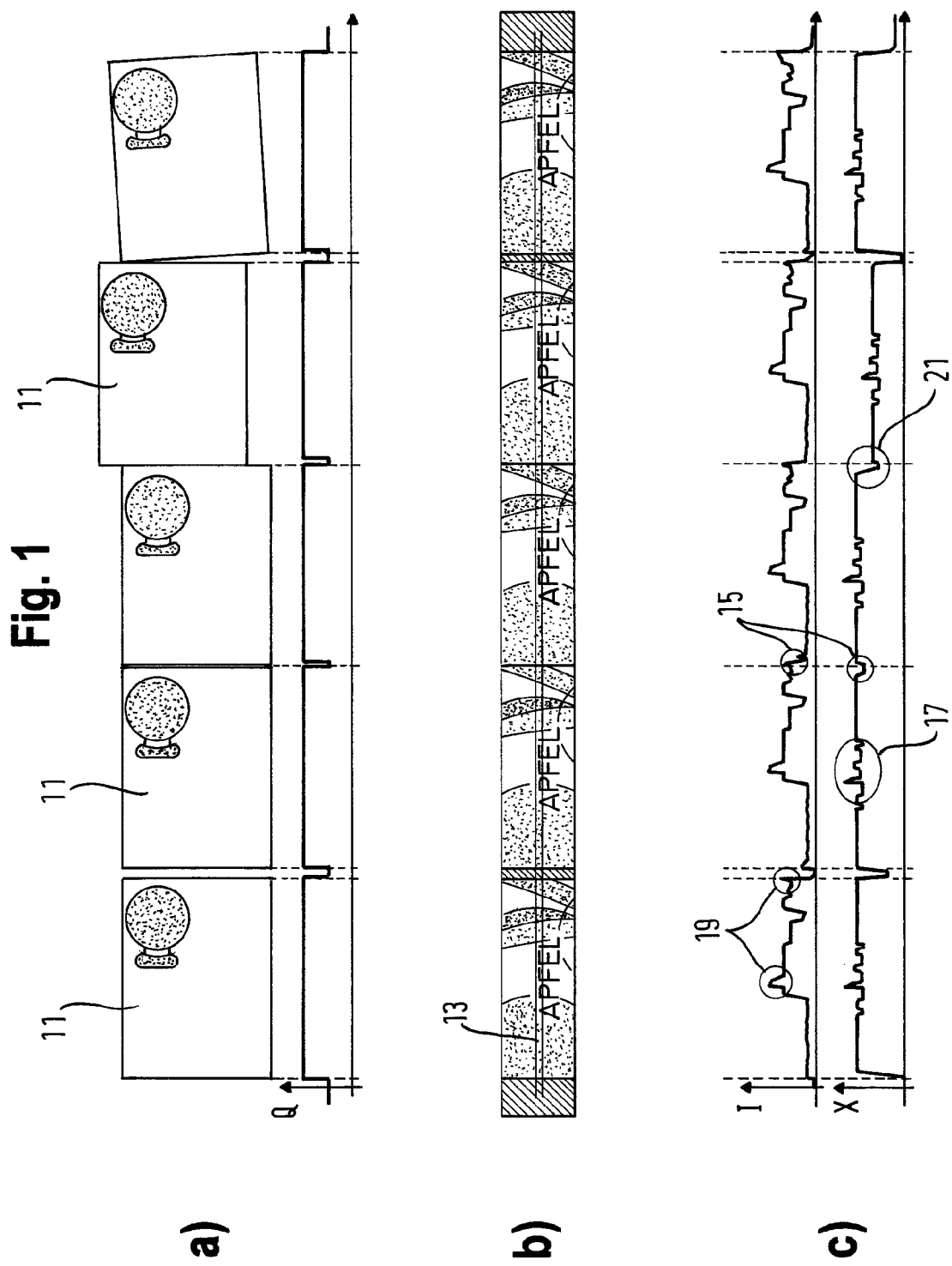

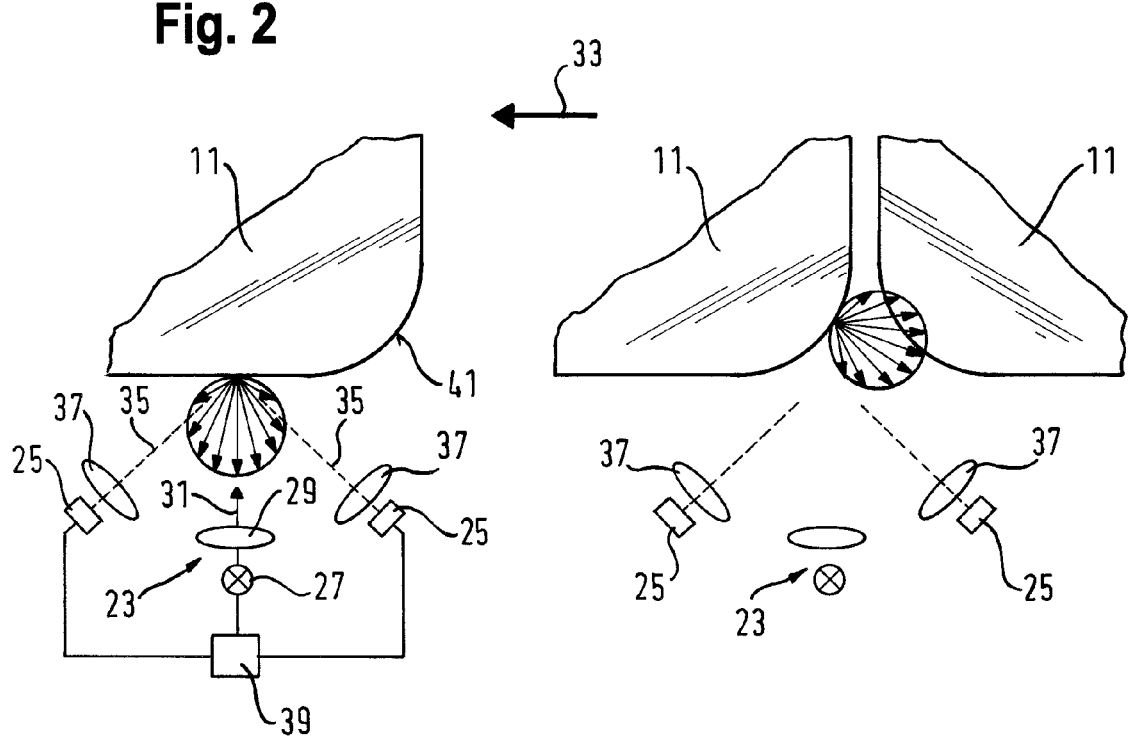
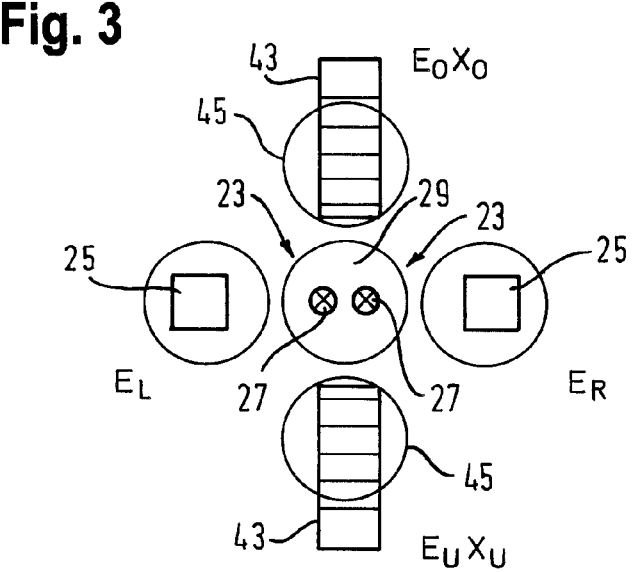

OPTOELECTRONIC SENSOR FOR DETECTING OBJECT EDGES

The present invention relates to an optoelectronic sensor for detecting object edges of objects moved relative to the sensor.

Optoelectronic sensors are frequently used to recognize pieces of packaging, for example beverage cartons, transported along a conveyer belt for a subsequent further processing, for example an application of a straw. As a rule, the pieces of packaging are, however, not isolated in this process, but rather follow one another so closely that, when the pieces of packaging are led past the sensor, the transition from one packaging to the next packaging can only be recognized with difficulty using a conventional triangulation scanner with a spatially resolving light receiver, whose basic operation is sufficiently known and will therefore not be explained in any more detail here, as will be illustrated in the following with reference to FIG. 1.

FIG. 1a shows a plan view of a plurality of beverage cartons 11 which are arrange directly behind one another and which are moved past a triangulation scanner on a conveyer belt and a diagram of the associated desired curve of the switching signal of the triangulation sensor. FIG. 1b shows a detail of a side view of the beverage carton 11 from FIG. 1a and a scan track 13 of a light spot produced on the beverage carton 11 by the transmitted light beam of the triangulation sensor. FIG. 1c shows the curve of a position signal X taken in this process and the corresponding curve of an intensity signal I of the scanner.

A large gap which can be detected sufficiently well via the two signals X and I is present between the first and second beverage cartons from the left. If, however, a small gap is present, as is the case between the second and the third beverage cartons, the associated transition is no longer unambiguously recognizable with reference to the curves X and I, as is shown at 15. Furthermore, further error sources exist which make it difficult to generate the desired switching signal from the signal curves X and I, in particular by one or more threshold value comparisons. For example, the scan track 13 leads over a text printed onto the beverage carton in black, i.e. ultimately over an inhomogeneous texture, so that the center of mass of an image of the light spot taken by the light receiver and thus the position signal X fluctuates accordingly, as shown at 17. In addition, a shiny region by which the light is at least partly reflected in a directed manner or an offset of a beverage carton perpendicular to the conveying direction can interfere with the intensity signal I, as is shown at 19 and 21. These error sources can consequently cause a higher signal stroke than a transition between two beverage cartons following one another so that the edges of the beverage carton cannot be robustly detected.

It is known from the prior art to accelerate the pieces of packaging directly at a point of intersection between a slower conveyer belt and a faster conveyer belt to produce large, and thus easily detectable, gaps. Such arrangements, however, require a lot of room and are very expensive in comparison with an optoelectronic sensor alone.

It is therefore the object of the disclosed technology to provide an inexpensive optoelectronic sensor of the initially named kind with a robust edge recognition.

This object is satisfied by an optoelectronic sensor having a light transmission device with at least one light transmitter, in particular at least two light transmitters, for generating a respective collimated or focused transmitted light beam, having at least two light receivers for imaging a light spot produced by the respective transmitted light beam on an object, wherein the two light receivers are arranged on two mutually opposite sides of the light transmission device, and having an evaluation unit which is designed to compare the two received intensities of the two images of the respective light spot taken by the two light receivers with one another and to evaluate the result of the respective comparison to recognize an object edge.

The transition between two objects following one another can hereby in particular be recognized with referenced to the rear object edge of the front object in the direction of movement and/or with respect to the front end of the rear object. The two light receivers are in this respect preferably arranged in a receiver plane which is in particular formed by the light transmission device and the two light receivers, which in particular extends horizontally and which extends transversely, in particular perpendicular to the orientation of the object edges.

If the respective transmitted light beam is, for example, orientated at least substantially parallel to a normal of a flat side of the object facing the sensor, at least approximately the same portion of light is incident onto the two light receivers, i.e. the two light receivers detect at least approximately the same received intensity (balance state). If the transmitted light beam is incident onto the rear edge, more light is incident onto the rear light receiver in the direction of movement and less light is incident onto the front light receiver than in the balance state. This is just the reverse for the front edge. The two light receivers thus represent a kind of energetic balance which can deflect in different directions depending on whether it is a rear object edge or a front object edge.

An evaluation can then be made as to whether a gap or an object edge is present or not by a comparison, in particular a difference formation, of the received intensities which are taken by the two light receivers and which change opposite to one another and therefore have a large signal stroke relative to one another on the incidence of the transmitted light beam onto an object on a simultaneous movement of the object in the region of an edge. Edges of objects disposed very closely to one another or small gaps can be recognized by such a comparison which is based on the energetic evaluation of two received intensities.

An evaluation of the result of a respective comparison in particular and preferably also includes the case that the result of the respective comparison is evaluated together with one or more results of one or more other comparisons. If the evaluation is based on a single result, e.g. on a difference from the two received intensities, the evaluations can e.g. comprise a comparison of the difference with a threshold value.

A substantial cost advantage with respect to the implementations known from the prior art can be achieved by such a sensor. Such a sensor enables high switching frequencies with a simultaneously relatively small power consumption and can be built in a relatively small size.

It is preferred if the evaluation unit is designed to evaluate the results of the comparison of at least two imagings together, with the common evaluation preferably taking place continuously or progressively in time. An imaging is in particular to be understood as an image detection or a shot of the two images of the light spot of the transmitted light beam of a light sensor taken by the two light receivers.

If the conveying speed of the objects is known, the time offset is also known, with a known gap width to be recognized, with which a front edge should be detected after the detection of a potential rear edge so that the robustness of the edge recognition can already be increased with only one light transmitter. It is therefore in particular preferred if the at least two imagings take place sequentially in time or at least two different points in time. The time interval between the at least two imagings can lie within a defined time interval.

Alternatively and/or additionally, however, provision can also be made that the at least two imagings take place by the at least two light transmitters. Two sensed images obtained by two imagings are therefore in turn evaluated together which are, however, in this case not associated with a single light transmitter of whose light spot at least two imagings are taken sequentially, but with at least two light transmitters by which the at least two imagings can be taken at least substantially simultaneously in time, with "substantially" in particular relating to light transmitters controlled alternately. It is possible by the at least two light transmitters to detect at least substantially at the same time a potential front edge (by the one light transmitter) and a potential rear edge (by the other light transmitter). The conveying speed of the objects does not have to be known in this respect. It is in particular preferred in this case if the two light receivers and the light transmitter or transmitters are provided in a linear arrangement or are arranged in a row and/or are arranged in the aforesaid receiver plane.

For example, a difference can be formed from the two individual differences (of the received intensities taken by the two light receivers) obtained at the at least two different points in time and/or by the at least two light transmitters and optionally weighted and this difference can be compared with a threshold value. Generally, instead of this difference formation, an algorithm can very generally be used by which the two single differences can be compared with one another and can be evaluated together.

The sensor can in particular be designed to adapt the time interval between the at least two imagings and/or the distance of the at least two light transmitters from one another to a defined expected distance between two adjacent objects or to a defined width of a gap formed between two adjacent objects. The sensor can thereby be set to different gap widths, in particular to the desired gap width to be detected.

The at least two light receivers are preferably purely energetic receivers, i.e. receivers which do not have any spatial resolution. Such receivers offer a cost advantage over spatially resolving light receivers. It is in particular preferred in this case if the sensor is designed to control the at least two light transmitters alternately so that a distinguishing of the sensed images of different light transmitters is possible. If light receivers with spatial resolution are provided, only the received intensities are preferably evaluated by the evaluation unit and not any distance information.

An even number of light receivers is preferable provided, with at least four light receiver being provided, with in each case two light receivers forming a pair of light receivers and with the two light receivers of a respective pair being arranged on the two mutually opposite sides of the light transmitter device, with the evaluation device preferably being designed to use only one selected pair or a plurality of selected pairs for the recognition of object edges, with in particular the number of selected pairs being smaller than the number of existing pairs. The pair or the pairs of light receivers can therefore be selected which is/are best suited for an edge recognition.

If a plurality of pairs are selected, it is preferred if the results of the plurality of pairs are set off against one another and are evaluated or assessed together. The pairs are in particular arranged in receiver planes extending parallel to one another or are arranged above one another.

It can, for example, occur that an object is tilted rearward with respect to an axis extending in the conveying direction so that a particularly high portion of light is then reflected onto a pair arranged in an upper receiver plane due to a shine effect associated with the tilting of the object, whereby this pair is dazzled and the imaging of this pair is disturbed. This upper pair is therefore not taken into account in the edge recognition. Additionally and/or alternatively, it can then also occur that a pair arranged in a lower receiver plane then receives too little light so that the imaging of this pair is also not taken into account in the edge recognition. It can in particular be preferred for this reason if the selection is dependent on at least one of the received intensities of the two images taken by the two light receivers of the respective pair, with a pair preferably not being selected if the at least one of the received intensities exceeds a defined upper threshold value and/or falls below a defined lower threshold value.

In accordance with one configuration, at least one further spatially resolving light receiver, in particular at least two further spatially resolving light receivers, is/are provided. The initially named further error sources can hereby be eliminated. The two further light receivers can in particular be arranged on the other two mutually opposite sides of the light transmission device.

The evaluation device is preferably designed to set off against one another the two distances determined by means of triangulation from the positions of the two images of the respective light spot taken by the two further light receivers and to evaluate the result of the respective setting off, with an in particular weighted average value preferably being formed from the two distances in the respective setting off. Disadvantageous effects such as are caused by an inhomogeneous texture can hereby be avoided since a displacement of the center of mass in the one of the two further light receivers can be balanced by an opposite center of mass displacement equal in magnitude in the other of the two further light receivers.

The weighting preferably depends on the two received intensities of the two images of the respective light spot taken by the two further light receivers, with the relative weighting of the distance determined from the position of the respective image preferably being the smaller, the larger the relative received intensity of the respective image is. Errors in the edge detection caused by shine effects or reflection can hereby be largely suppressed since normally only the distance determination of one of the two further light receivers is disturbed by a shiny region. The "disturbed" light receiver then has an increased received intensity with respect to the other further light receiver so that—provided an increased received intensity is found—the corresponding distance can be given less weight in the average value formation.

This aspect and further developments thereof are also claimed independently of the at least two light receivers, i.e. the disclosed technology also relates to an optoelectronic sensor for recognizing object edges of objects moved relative to the sensor, having a light transmission device with at least one light transmitter, in particular at least two light transmitters, for generating a respective collimated or focused transmitted light beam, having at least two light receivers for imaging a light spot produced by the respective transmitted light beam on an object, wherein the two light receivers are arranged on two mutually opposite sides of the light transmission device, and having an evaluation unit which is designed to set off the two distances against one another determined by means of triangulation from the positions of the two images of the respective light sport taken by the two light receivers and to evaluate the result of the respective setting off to recognize an object edge, wherein a weighted average value is formed from the two distances in the respective setting off and wherein the weighting depends on the two received intensities of the two images of the respective light spot taken by the two further light receivers.

Provision can furthermore be made that the evaluation unit is designed to evaluate the results of the setting off processes for the at least two light transmitters together. This in particular allows a disturbance in the edge detection to be avoided by an object offset perpendicular to the conveying direction relative to the other objects since it can hereby be recognized if the light spots associated with the at least two light transmitters are incident onto different objects. It is in particular preferred in this case if the sensor is designed to control the at least two light transmitters alternately so that a distinguishing of the received intensities and determined distances of different light transmitters is possible.

In accordance with another configuration, the light transmission device and the at least two light receivers and/or at least two further light receivers each include a polarization filter, with all polarization filters of the sensor preferably being either linear polarization filters or circular polarization filters and/or with the polarization direction of the polarization filter of the respective light transmitter and/or respective further light receiver preferably being at least substantially opposite or corresponding to the polarization direction of the polarization filter of the light transmission device. In an embodiment of the sensor having linear polarization filters, the respective sensor light beam is polarized in a linear fashion. On a reflection at an object, the polarization of the light is maintained; on a remission, the polarization is lost. Reflected light which causes errors in the distance determination can be at least largely blocked out by oppositely orientated linear polarization filters, i.e. linear polarization filters rotated by at least substantially 90° with respect to one another. In an embodiment of the sensor having circular polarization filters, the respective transmitted light beam is polarized in circular fashion in one of two rotational directions, left or right. On a reflection at an object, the direction of rotation of the polarization of the light is reversed or rotated; on a remission, the polarization is lost. Reflected light can in turn be at least largely blocked out by polarization filters directed in the same sense, i.e. having the same direction of rotation.

The present disclosure furthermore relates to a method of detecting object edges of objects moved relative to an optoelectronic sensor, wherein at least one, in particular two, respectively collimated or focused transmitted light beams are produced by a light transmission device, wherein a light spot produced by the respective transmitted light beam on an object is imaged by two light receivers which are arranged on two mutually opposite sides of the light transmission device, wherein the two received intensities of the two images of the respective light spot taken by the two light receivers are compared with one another and wherein the result of the respective comparison is evaluated to recognize an object edge.

Preferred embodiments of the method in accordance with the disclosure result in an analog manner from the preferred embodiments of the image sensor in accordance with the disclosure.

Non-restricting embodiments of the disclosed technology are shown in the drawing and will be described in the following.

FIG. 1 beverage cartons arranged in a row as well as the signals determined for this purpose by a conventional triangulation sensor;

FIG. 2 an optoelectronic sensor in accordance with one configuration in a plan view; and FIG. 3 an optoelectronic sensor in accordance with another configuration in a rear view.

The sensor shown in FIG. 2 includes a light transmission device having a light transmitter 23 and two light receivers 23 arranged in a reception plane at least substantially symmetrical to both sides, i.e. left and right, of the light transmitter 23. The light transmitter 23, which includes a light source 27 and a transmission lens 29, transmits a collimated or focused transmitted light beam 31 which is incident onto beverage cartons 11 which are moved past the sensor in the conveying direction 33. The transmitted light beam 31 produces a light spot there. The transmitted light beam 31 is in this respect at least substantially perpendicular on the sides of the beverage cartons 11 facing the sensor.

The light with a Lambert characteristic remitted at the location of the light spot returns to the sensor as reception light beams 35 and is detected in the light receivers via reception lenses 37. The light receivers 25 are purely energetic receivers without spatial resolution so that only the received intensities of the images of the light spot taken by the light receiver 25 are detected there. Furthermore, a control and evaluation unit 39 connected to the light transmitter 23 and to the light receivers 25 is provided to control the light transmitters 23 and to evaluate the aforesaid received intensities.

If the transmitted light beam 31 is incident onto a beverage carton 11 outside an edge 41 (left hand Figure), the received intensity detected by the front light receiver 25 in the conveying direction 33 corresponds at least approximately to the received intensity detected by the rear light receiver 25 in the conveying direction 33 since at least approximately the same amount of light is incident onto the two light receivers 25. An edge 41 is therefore not present. If, in contrast, the transmitted light beam 31 is incident onto the beverage carton 11 in the region of the edge 41 (right hand Figure), much more light is incident onto the rear light receiver 25 in the conveying direction 33 due to the rounding of the edge 41 so that the received intensities of the two light receivers 25 differ greatly from one another.

The difference of the two received intensities can therefore be used as a criterion for the presence of an edge 41. The criterion is in particular satisfied when the difference exceeds a defined threshold value. Beverage cartons 11 arranged very closely to one another in a row or small gaps between beverage cartons 11 can also hereby be detected.

The rear edge 41 of the one beverage carton 11 is followed with a specific time interval, whose limits result from the conveying speed of the beverage cartons 11 and the potential intervals of the beverage cartons 11 with respect to one another, by the front edge 41 of the next beverage carton 11, with the difference having opposite signals for the two edges. The robustness of the gap recognition or edge recognition can be increased by the evaluation criterion whether a rear edge 41 is followed by a front edge 41 within a defined time interval. The difference can in particular be formed from the difference for the rear edge 41 and the difference for the front edge 41 and can be compared with a threshold value, with the criterion for the presence of a gap or of a front and read edge 41 being satisfied on an exceeding of the threshold value. The sign of this higher ranking difference in this respect, however, depends on the conveying direction 33.

The sensor shown simplified in FIG. 3 is a further development of the sensor shown in FIG. 2. In contrast to the sensor shown in FIG. 2, the sensor in accordance with FIG. 3 includes not only one, but two light transmitters 23 which are controlled alternately and which are arranged together with the two light receivers 25 in a horizontal row and additionally two further spatially resolving light receivers 43 with reception lenses 45. The two light transmitters 23 include two light sources 27 and a common transmission lens 29.

Generally, however, two transmission lenses can also be provided or only one light source from whose light beams two transmission light beams are then produced. The light transmitters 23 are preferably lasers or LEDs. The two light receivers 25 only deliver received intensities; the two further light receivers 43 each additionally deliver a piece of position or distance information. Generally, however, the two light receivers 25 can also be formed as spatially resolving light receivers and/or deliver a piece of position or distance information.

The two further light receivers 43 are arranged at least substantially symmetrically above and below the light transmission device or in a further reception plane which is perpendicular on the receiver plane formed by the light transmitters 23 and the light receivers 25. In the rear view shown, the light receivers 25 and the further light receivers 43 are distributed in a circular fashion about the light transmission device offset by 90° with respect to one another. The further light receivers 43 can, for example be single-line image sensors or image sensors having a pixel matrix or PIN diodes.

A rear edge 41 and a front edge 41 can be detected substantially simultaneously by the two light transmitters 23 for a difference formation analog to the aforesaid difference formation. The two light receivers 25 in this respect have a sufficiently large reception area to be able to take the images of both the light spot of the transmitted light beam 31 of the first light transmitter 23 and of the light spot of the transmitted light beam 31 of the second light transmitter 23.

The corresponding criterion for the presence of an object is:

$$\frac{E_{L1} - E_{R1}}{E_{L1} + E_{R1} + M} - \frac{E_{L2} - E_{R2}}{E_{L2} + E_{R2} + M} < \text{Limit value 1}, \quad (1)$$

where $E_{L1}$ is the received intensity of the left light receiver for the first light transmitter, $E_{R1}$ is the received intensity of the right light receiver for the first light transmitter, $E_{L2}$ is the received intensity of the left light receiver for the second light transmitter and $E_{R2}$ is the received intensity of the right light receiver for the second light transmitter, and where M≠0, whereby a division by 0 should be avoided with received intensities of 0.

This difference adopts a maximum value with a simultaneous detection of the two edges 41 which corresponds to the sum of the amount of the difference for the front edge 41 and the amount of the difference for the rear edge 41 and which exceeds the limit value 1 so that the criterion for the present of a gap 41 is satisfied. The sign of this difference is then independent of the conveying direction 33.

Two triangulation sensors are realized by the first or second light transmitter 23 and the two further light receivers 43 and the respective distance of a beverage carton 11 from the sensor can be calculated by them. Since the further light receivers 43 are arranged symmetrically about the light transmitters 23, a disturbance of the two calculated distances caused by an inhomogeneous texture on the respective beverage carton 11 can be compensated. For this purpose, an average value is formed from the two calculated distances since, on the associated addition, the errors caused by the disturbance in the two calculated distances are largely mutually cancelled out.

The two calculated distances can be weighted in the average value formation. The weighting of the respective calculated distance is in this respect the larger, the smaller the relative received intensity on the respective further light receiver 43 is. This is therefore in particular advantageous because hereby a calculated distance which is defective due to a shine effect is given less weighting. The object distance can hereby be determined with special precision and a particularly robust background blocking out can thereby be achieved.

The corresponding criterion for the presence of an object is then:

$$\frac{1}{2}\left(X_{O1}\frac{E_{U1}}{E_{O1} + E_{U1}} + X_{U1}\frac{E_{O1}}{E_{O1} + E_{U1}}\right) < \text{Limit value 2}, \quad (2)$$

where $E_{U1}$ is the received intensity of the lower light receiver for the first light transmitter, $E_{O1}$ is the received intensity of the upper light receiver for the first light transmitter, $X_{O1}$ is the determined distance of the upper light receiver for the first light transmitter and $X_{U1}$ is the determined distance of the lower light receiver for the first light transmitter.

Since two light transmitters 23 are present, a mutual offset of two beverage cartons 11 following one another can be recognized perpendicular to the conveying direction 33 (i.e. an edge is present), when the transmitted light beam 31 of the one of the two light transmitters 23 is incident on the one beverage carton 11 and the transmitted light beam 31 of the other light transmitter 23 is incident on the other beverage carton 11.

The corresponding criterion for the presence of an object in this case is:

$$\left(X_{O1}\frac{E_{U1}}{E_{O1} + E_{U1}} + X_{U1}\frac{E_{O1}}{E_{O1} + E_{U1}}\right) - \\ \left(X_{O2}\frac{E_{U2}}{E_{O2} + E_{U2}} + X_{U2}\frac{E_{O2}}{E_{O2} + E_{U2}}\right) < \text{Limit value 3}, \quad (3)$$

where $E_{U2}$ is the received intensity of the lower light receiver for the second light transmitter, $E_{O2}$ is the received intensity of the upper light receiver for the second light transmitter, $X_{O2}$ is the determined distance of the upper light receiver for the second light transmitter and $X_{U2}$ is the determined distance of the lower light receiver for the second light transmitter.

It is furthermore preferred if a criterion for the presence of an object is set up in the sense of a background blocking out which is directed at the total energy received by the two further light receivers 43.

$$E_U + E_O > \text{Limit value 4}, \quad (4)$$

where $E_U$ is the received intensity of the lower light receiver for the first and/or second light transmitter and $E_O$ is the received intensity of the upper light receiver for the first and/or second light transmitter.

The sensor in accordance with FIG. 34 is preferably designed so that an object determination signal is output, i.e. that the presence of a beverage carton 11 is recognized when the conditions (1) to (4) are satisfied. If at least one of the named conditions is not satisfied, a transition is present between two beverage cartons 11 following one another or an edge 41 is recognized.

A particularly robust edge recognition can be achieved with the disclosed technology.

REFERENCE NUMERAL LIST 11 beverage carton
13 scan track
15 small gap 17 inhomogeneous texture
19 shiny region
21 offset
23 light transmitter
25 light receiver
27 light source
29 transmission lens
31 transmitted light beam
33 conveying direction
34 received light beam
37 reception lens
39 control and evaluation unit
41 edge
43 further light receiver
45 reception lens

The invention claimed is:

1. An optoelectronic sensor for recognizing object edges of objects moved relative to the sensor,
having a light transmission device with at least one light transmitter (23) for producing a respective collimated or focused transmitted light beam (31);
having at least two light receivers (25) for imaging a light spot produced on an object (11) by the respective transmitted light beam (31), wherein the two light receivers (25) are arranged on two mutually opposite sides of the light transmission device; and
having an evaluation unit (39) which is designed to compare two received intensities of two images of the respective light spot taken by the two light receivers (25) with one another and to evaluate a result of the respective comparison, the two images of the respective light spot of the transmitted light beam of the light transmitter taken by the two light receivers defining a sensed image; and
wherein the evaluation unit is configured to compare the results of comparisons of at least two sensed images with one another to recognize an object rear edge and an object front edge.

2. A sensor in accordance with claim 1, wherein the defining of the at least two sensed images take place sequentially in time.

3. A sensor in accordance with claim 2, wherein a time interval between the defining of the at least two sensed images is adjustable.

4. A sensor in accordance with claim 1, wherein an even number of light receivers (25) is provided, with at least four light receivers (25) being provided, with two respective light receivers (25) forming a pair of light receivers (25), and with the two light receivers (25) of a respective pair being arranged on the two mutually opposite sides of the light transmission device.

5. A sensor in accordance with claim 4, wherein the evaluation unit (39) is designed to use only one selected pair or a plurality of selected pairs for the recognition of object edges (41).

6. A sensor in accordance with claim 5, wherein the number of the selected pairs is smaller than the number of pairs present.

7. A sensor in accordance with claim 1, wherein the two light receivers (25) and the light transmitter or transmitters (23) is/are provided in a linear arrangement;
and/or wherein the sensor is designed to control the at least two light transmitters (23) alternately.

8. A sensor in accordance with claim 1, wherein at least one further spatially resolving light receiver (43) is provided.

9. A sensor in accordance with claim 8, wherein at least two further spatially resolving light receivers (43) are provided.

10. A sensor in accordance with claim 9, wherein the two further light receivers (43) are arranged on the other two mutually opposite sides of the light transmission device.

11. A sensor in accordance with claim 9, wherein the evaluation unit (39) is designed to calculate a common distance based on two distances determined by means of triangulation from positions of the two images of the respective light spot taken by the two further light receivers (43) and to evaluate the result of the respective calculation.

12. A sensor in accordance with claim 11, wherein an average value is formed from the two distances in the respective calculation.

13. A sensor in accordance with claim 11, wherein the light transmission device comprises at least two light transmitters (23), the evaluation unit (39) being designed to evaluate the results of the calculations for the at least two light transmitters (23) together.

14. A sensor in accordance with claim 11, wherein a weighted average value is formed from the two distances in the respective calculation.

15. A sensor in accordance with claim 14, wherein a weighting depends on the two received intensities of the two images of the respective light spot taken by the two further light receivers (43).

16. A sensor in accordance with claim 15, wherein a relative weighting given to the distance determined from the position of the respective image is decreased when the relative weight given to the received intensity of the respective image is increased.

17. A sensor in accordance with claim 1, wherein the light transmission device and the at least two light receivers (25) and/or at least two further light receivers (43) each include a polarization filter.

18. A sensor in accordance with claim 17, wherein all polarization filters of the sensor are either linear polarization filters or circular polarization filters.

19. A sensor in accordance with claim 17, wherein the polarization direction of the polarization filter of the respective light receiver and/or of the respective further light receiver is opposite to or corresponds to the polarization direction of the light transmission device.

20. A sensor in accordance with claim 1, wherein the light transmission device comprises at least two light transmitters (23), the at least two sensed images comprising a first sensed image based on a first light transmitter and a second sensed image based on a second light transmitter.

21. A sensor in accordance with claim 20, wherein a distance of the at least two light transmitters (23) from one another to a defined expected distance between two 10 adjacent objects (11) is adjustable.

22. An optoelectronic sensor for recognizing object edges of objects moved relative to the sensor,
having a light transmission device with at least one light transmitter (23) for producing a respective collimated or focused transmitted light beam (31);
having at least two light receivers (25) for imaging a light spot produced on an object (11) by the respective transmitted light beam (31), wherein the two light receivers (25) are arranged on two mutually opposite sides of the light transmission device; and
having an evaluation unit (39) which is designed to compare two received intensities of two images of the respective light spot taken by the two light receivers (25) with one another and to evaluate a result of the respective comparison to recognize an object front edge and an object rear edge, wherein an even number of light receivers (25) is provided, with at least four light receivers (25) being provided, with two respective light receivers (25) forming a pair of light receivers (25), and with the two light receivers (25) of a respective pair being arranged on the two mutually opposite sides of the light transmission device, wherein the evaluation unit (39) is designed to use only one selected pair or a plurality of selected pairs for the recognition of object edges (41), wherein the selection is dependent on at least one of the received intensities of the two images taken by the two light receivers (25) of the respective pair.

23. A sensor in accordance with claim 22, wherein one pair is not selected when said at least one of the received intensities exceeds a defined upper threshold value and/or falls below a defined lower threshold value.

24. A method of detecting object edges of objects moved relative to an optoelectronic sensor, wherein at least one respectively collimated or focused transmitted light beam is produced by a light transmission device;

a light spot produced by the respective transmitted light beam on an object is imaged by two light receivers arranged on two mutually opposite sides of the light transmission device; and the two received intensities of two images of the respective light spot taken by the two light receivers are compared with one another and a result of the respective comparison is evaluated, the two images of the respective light spot of the transmitted light beam of the light transmitter taken by the two light receivers defining a sensed image; and the results of comparisons of at least two sensed images are compared with one another to recognize an object rear edge and an object front edge.

* * * * *